United States Patent
Gao et al.

(10) Patent No.: US 12,372,792 B2
(45) Date of Patent: Jul. 29, 2025

(54) HIGH INDEX EDGE BLACKENING MATERIAL

(71) Applicant: Applied Materials, Inc., Santa Clara, CA (US)

(72) Inventors: Yige Gao, Santa Clara, CA (US); Rami Hourani, Santa Clara, CA (US); Xiaopei Deng, San Jose, CA (US); Amita Joshi, Fremont, CA (US); Ludovic Godet, Sunnyvale, CA (US); Kangkang Wang, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 723 days.

(21) Appl. No.: 17/647,361

(22) Filed: Jan. 7, 2022

(65) Prior Publication Data

US 2022/0221723 A1    Jul. 14, 2022

Related U.S. Application Data

(60) Provisional application No. 63/135,195, filed on Jan. 8, 2021.

(51) Int. Cl.
*G02F 1/225* (2006.01)
*F21V 8/00* (2006.01)
(Continued)

(52) U.S. Cl.
CPC ........ *G02B 27/0172* (2013.01); *G02B 6/0011* (2013.01); *G02B 6/0026* (2013.01);
(Continued)

(58) Field of Classification Search
CPC .. G02B 6/243; G02B 6/0011; G02B 27/0172; G02F 1/225
See application file for complete search history.

(56) References Cited

U.S. PATENT DOCUMENTS

| | | |
|---|---|---|
| 8,189,263 B1 | 5/2012 | Wang et al. |
| 2007/0253717 A1 | 11/2007 | Charters et al. |

(Continued)

FOREIGN PATENT DOCUMENTS

| | | |
|---|---|---|
| WO | 2011119179 A | 9/2011 |
| WO | 2019195193 A | 10/2019 |

OTHER PUBLICATIONS

International Searh Report / Written Opinion issued to PCT/US2022/011430 on Apr. 22, 2022.

(Continued)

*Primary Examiner* — Eric Wong
(74) *Attorney, Agent, or Firm* — Patterson + Sheridan, LLP

(57) ABSTRACT

Embodiments described herein include a waveguide combiner having an edge coated with an optically absorbent composition and a method of coating the edge of the waveguide combiner with the optically absorbent composition. The optically absorbent composition includes one or more types of nanoparticles or microparticles, at least one of one or more dyes or one or more pigments, and a polymer matrix of one or more binders. The method includes producing an optically absorbent formulation. The optically absorbent formulation includes one or more types of particles, at least one of one or more dyes or one or more pigments, one or more binders, and one or more solvents. The optically absorbent formulation is applied on an edge of a waveguide combiner using an edge blackening tool. The formulation is cured with radiation to form the optically absorbent composition.

22 Claims, 1 Drawing Sheet

(51) Int. Cl.
*G02B 6/24* (2006.01)
*G02B 27/01* (2006.01)

(52) U.S. Cl.
CPC .............. *G02B 6/243* (2013.01); *G02F 1/225* (2013.01); *G02B 2207/101* (2013.01); *G02F 2201/08* (2013.01); *G02F 2201/302* (2013.01); *G02F 2202/04* (2013.01); *G02F 2202/36* (2013.01)

(56) References Cited

U.S. PATENT DOCUMENTS

| | | | | |
|---|---|---|---|---|
| 2008/0237611 | A1* | 10/2008 | Cok | H10K 50/86 257/79 |
| 2015/0306848 | A1* | 10/2015 | Anderson | B32B 17/10137 428/501 |
| 2018/0059320 | A1 | 3/2018 | Miller et al. | |
| 2018/0267312 | A1 | 9/2018 | Melli | |
| 2020/0064539 | A1 | 2/2020 | Kim et al. | |
| 2020/0134773 | A1* | 4/2020 | Pinter | G01N 21/8806 |
| 2020/0241174 | A1* | 7/2020 | Fromentin | G02B 1/14 |
| 2021/0109278 | A1* | 4/2021 | Peroz | G02B 6/0016 |
| 2021/0294103 | A1* | 9/2021 | Klug | G02B 27/0172 |

OTHER PUBLICATIONS

Anonymous Nanoparticle: "Nanoparticle—Wikipedia", Jan. 2, 2021 (Jan. 2, 2021), XP093216820, Retrieved from the Internet: URL:https://en.wikipedia.org/w/index.php?title=Nanoparticle&oldid=997901455* section "Coatings"; table in section "Applications".
European Search Report issued to patent application No. 22737099.6 on Nov. 11, 2024.

* cited by examiner

HIGH INDEX EDGE BLACKENING MATERIAL

CROSS-REFERENCE TO RELATED APPLICATIONS

This application claims priority to United States Provisional Patent Application Ser. No. 63/135,195, filed on Jan. 8, 2021, which is herein incorporated by reference.

BACKGROUND

Field

Embodiments of the present disclosure generally relate to optical devices. More specifically, embodiments described herein relate a waveguide combiner having an edge coated with an optically absorbent composition and a method of coating the edge of the waveguide combiner with the optically absorbent composition.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Waveguide combiners, such as augmented reality waveguide combiners, are used to assist in overlaying images. Generated light is propagated through a waveguide combiner until the light exits the waveguide combiner and is overlaid on the ambient environment. Optical devices may require coating the edge of the waveguide combiner. The coating improves the performance of the waveguide combiner.

Accordingly, what is needed in the art is a waveguide combiner having an edge coated with an optically absorbent composition and a method of coating the edge of the waveguide combiner with the optically absorbent composition.

SUMMARY

In one embodiment, a waveguide combiner is provided. The waveguide combiner includes a substrate, a plurality of structures disposed on the substrate, an edge, and an optically absorbent composition disposed on the edge of the substrate. The optically absorbent composition includes one or more types of nanoparticles or microparticles, at least one of one or more dyes or one or more pigments, and a polymer matrix of one or more binders.

In another embodiment, a waveguide combiner is provided. The waveguide combiner includes a substrate having a substrate refractive index greater than about 1.8, a plurality of structures disposed on the substrate, an edge, and an optically absorbent composition disposed on the edge of the substrate. The optically absorbent composition has a refractive index of about 1.7 or greater and an optical density of about 2.0 or greater. The optically absorbent composition includes one or more types of nanoparticles or microparticles, at least one of one or more dyes or one or more pigments, and a polymer matrix of one or more binders. The one or more types of nanoparticles or microparticles are disposed in and supported by the polymer matrix, and the one or more binders are curable by radiation.

In yet another embodiment, a method is provided. The method includes producing an optically absorbent formulation. The optically absorbent formulation includes one or more types of particles, at least one of one or more dyes or one or more pigments, one or more binders, and one or more solvents. The optically absorbent formulation is applied on an edge of a waveguide combiner using an edge blackening tool. The formulation is cured with radiation to form an optically absorbent composition that includes the one or more types of particles, the at least one of one or more dyes or one or more pigments, and a polymer matrix of the one or more binders, wherein the particles are disposed in and supported by the polymer matrix.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to a waveguide combiner having an edge coated with an optically absorbent composition and a method of coating the edge of the waveguide combiner with the optically absorbent composition.

The waveguide combiner includes a substrate, a plurality of structures disposed on the substrate, an edge, and an optically absorbent composition disposed on the edge of the substrate. The optically absorbent composition includes one or more types of nanoparticles or microparticles, at least one of one or more dyes or one or more pigments, and a polymer matrix of one or more binders. The method includes producing an optically absorbent formulation. The optically absorbent formulation includes one or more types of particles, at least one of one or more dyes or one or more pigments, one or more binders, and one or more solvents. The optically absorbent formulation is applied on an edge of a waveguide combiner using an edge blackening tool. The formulation is cured with radiation to form an optically absorbent composition that includes the one or more types of particles, the at least one of one or more dyes or one or more pigments, and a polymer matrix of the one or more binders, wherein the particles are disposed in and supported by the polymer matrix.

Figure 1:
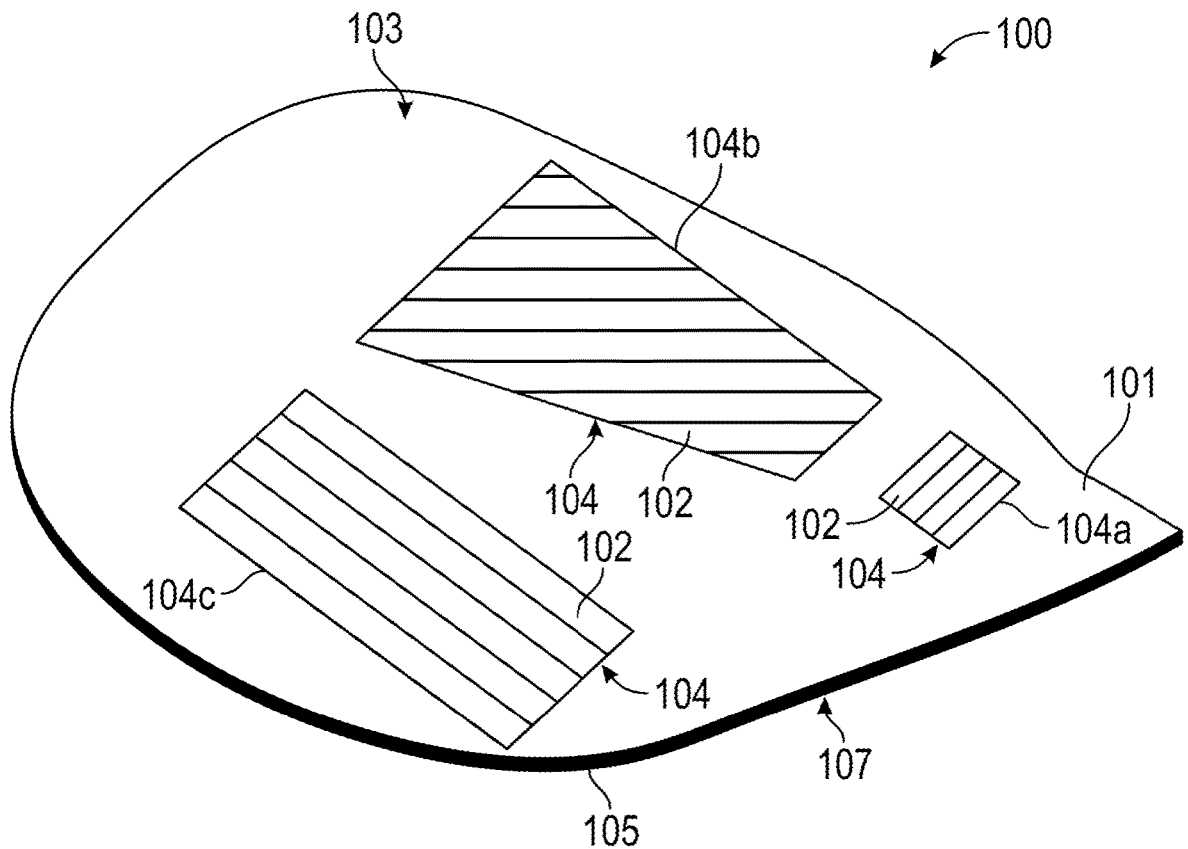
FIG. 1 is a perspective, frontal view of a waveguide combiner according to embodiments.

FIG. 1 is a perspective, frontal view of a waveguide combiner 100 according to embodiments. It is to be understood that the waveguide combiner 100 described herein is an exemplary waveguide combiner and other waveguide combiners may benefit the advantages provided from this disclosure. The waveguide combiner 100 includes a plurality of structures 102 disposed on a surface 103 of a substrate 101. The structures 102 may be nanostructures having sub-micron dimensions, e.g., nano-sized dimensions. The waveguide combiner 100 includes regions of the structures 102 corresponding to one or more gratings 104, such as a first grating 104a, a second grating 104b, and a third grating 104c. The waveguide combiner 100 includes at least the first grating 104a corresponding to an input coupling grating and the third grating 104c corresponding to an output coupling grating. The waveguide combiner 100 may further include the second grating 104b corresponding to an intermediate grating.

The substrate 101 may also be selected to transmit a suitable amount of light of a desired wavelength or wavelength range, such as one or more wavelengths from about 100 to about 3000 nanometers. Without limitation, in some embodiments, the optical device substrate 101 is configured such that the optical device substrate 101 transmits greater than or equal to about 50% to about 100%, of an infrared to ultraviolet region of the light spectrum. The optical device substrate 101 may be formed from any suitable material, provided that the optical device substrate 101 can adequately transmit light in a desired wavelength or wavelength range and can serve as an adequate support for the waveguide combiner 100 described herein. Substrate selection may include optical device substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the substrate 101 includes a transparent material. In one embodiment, which may be combined with other embodiments described herein, the substrate 101 is transparent with absorption coefficient smaller than 0.001. Suitable examples may include silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), sapphire, or combinations thereof. In another embodiment, which may be combined with other embodiments described herein, the substrate 101 has a refractive index greater than about 1.8. The substrate 101 having a refractive index greater than about 1.8 includes, but is not limited to, lithium tantalate ($LiTaO_3$), lithium niobate ($LiNbO_3$), SiC, or combinations thereof.

In operation of the waveguide combiner 100 a virtual image is projected from a near-eye display, such as a microdisplay, to the first grating 104a. The structures 102 of the first grating 104a in-couple the incident beams of light of the virtual image and diffract the incident beams to the second grating 104b. The diffracted beams undergo total-internal-reflection (TIR) until through the waveguide combiner 100 until the diffracted beams come in contact with structures 102 of the second grating 104b. The diffracted beams from the first grating 104a incident on the second grating 104b are split into a first portion beams refracted back or lost in the waveguide combiner 100, a second portion beams that undergo TIR in the second grating 104b until the second portion beams contact another structure of the plurality of structures 102 of the second grating 104b, and a third portion of beams that are coupled through the waveguide combiner 100 to the third grating 104c. The beams of the second portion of beams that undergo TIR in the second grating 104b continue to contact structures of the plurality of structures 102 until the either the intensity of the second portion of beams coupled through the waveguide combiner 100 to the second grating 104b is depleted, or remaining second portion of beams propagating through the second grating 104b reach the end of the second grating 104b.

The beams pass through the waveguide combiner 100 to the third grating 104c and undergo TIR in the waveguide combiner 100 until the beams contact a structure of the plurality of gratings 102 of the third grating 104c where the beams are split into beams that are refracted back or lost in the waveguide combiner 100, beams that undergo TIR in the third grating 104c until the beams contact another structure of the plurality of gratings 102, or beams that are out-coupled from the waveguide combiner 100 to the user's eye. The beams that undergo TIR in the third grating 104c continue to contact structures of the plurality of gratings 102 until the either the intensity of the beams pass through the waveguide combiner 100 to the third grating 104c is depleted, or remaining beams propagating through the third grating 104c have reached the end of the third grating 104c. The beams of the virtual image are propagated from the third grating 104c to overlay the virtual image over the ambient environment.

Some light provided to the waveguide combiner 100 strays from the intended path discussed above. For example, in some instances, a fraction of beams, i.e., stray light, reaches an edge 105 of the waveguide combiner 100. Upon reaching the edge 105, the stray light can then be (1) transmitted through the edge 105, (2) reflected, or scattered, through the waveguide combiner 100 at a variety of angles, or (3) absorbed at the edge 105. Stray light that is transmitted through the edge 105 and/or stray light that is scattered from the edge 105 through the waveguide combiner 100 reduce the quality of virial image via noise from the stray light. To reduce the amount of stray light transmitted through the edge 105 and the amount of stray light scattered in the waveguide combiner 100 by the edge 105, the edge 105 is coated with an optically absorbent composition 107.

The optically absorbent composition 107 includes one or more types of particles, at least one of one or more dyes or one or more pigments, and a polymer matrix of one or more binders. In some embodiment, the optically absorbent composition 107 further includes one or more filler dispersions, one or more photoiniators, one or more epoxy resins, one or more additives, one or more silanes, one or more isocyanates, one or more acids, one or more phosphine oxides, or combinations thereof. Examples of the filler dispersions include acrylates or methacrylates. Examples of the additives include amines or amides. Example of the dyes include organic dyes. The one or more pigments include, but are not limited to, carbon black, carbon nanotubes, iron oxide black, black pigments, or combinations thereof. The one or more binders, as described herein in a method 200 of forming an optically absorbent composition 107 on an edge 105 of a waveguide combiner 100, are operable to be cured by radiation, to form a polymer matrix. The one or more types of particles are disposed in the polymer matrix. The one or more binders include, but are not limited to, a UV curable binder, a LED curable binder, a thermal curable binder, an infrared curable binder, or combinations thereof.

The one or more types of particles include, but are not limited to, titanium oxide ($TiO_2$), Si, zirconium oxide ($ZrO_2$), zinc oxide (ZnO), ferrosoferric oxide ($Fe_3O_4$), germanium (Ge), SiC, diamond, dopants thereof, or any combination thereof. The one or more types of particles includes at least of nanoparticles or microparticles. Each nanoparticle (NP) or microparticle (MP) can be a coated particle, such as one, two, or more shells disposed around a core. In some examples, the NPs or MPs can contain one or more types of ligands coupled to the outer surface of the NPs or MPs (e.g., ligated NPs or stabilized NPs). The NPs or MPs can have one or more different shapes or geometries, such as spherical, oval, rod, cubical, wire, cylindrical, rectangular, or combinations thereof. The NPs can have a size or a diameter of about 2 nm, about 5 nm, about 8 nm, about 10 nm, about 12 nm, about 15 nm, about 20 nm, about 25 nm, about 30 nm, or about 35 nm to about 40 nm, about 50 nm, about 60 nm, about 80 nm, about 100 nm, about 150 nm, or about 200 nm. For example, the NPs can have a size or a diameter of about 2 nm to about 200 nm, about 2 nm to about 150 nm, about 2 nm to about 100 nm, about 2 nm to about 80 nm, about 2 nm to about 60 nm, about 2 nm to about 50 nm, about 2 nm to about 40 nm, about 2 nm to about 30 nm, about 2 nm to about 20 nm, about 2 nm to about 15 nm, about 2 nm to about 10 nm, about 10 nm to about 200 nm, about 10 nm to about 150 nm, about 10 nm to about 100 nm, about 10 nm to about 80 nm, about 10 nm to about 60 nm, about 10 nm to about 50 nm, about 10 nm to about 40 nm, about 10 nm to about 30 nm, about 10 nm to about 20 nm, about 10 nm to about 15 nm, about 50 nm to about 200 nm, about 50 nm to about 150 nm, about 50 nm to about 100 nm, about 50 nm to about 80 nm, or about 50 nm to about 60 nm.

A particle refractive index of the one or more types of particles is greater than 2.0. In some embodiments, which can be combined with other embodiments described herein, the particle refractive index of the one or more types of particles is about 2.4 or greater. The particle refractive index greater than 2.0 provide for the optically absorbent composition 107 having a refractive index of about 1.7 or greater. The optical density of the optically absorbent composition 107 of about 2.0 or greater is provide by the at least one of one or more dyes or one or more pigments. The refractive index of about 1.7 or greater and the optical density of about 2.0 or greater reduce the amount of stray light transmitted through the edge 105 and the amount of stray light scattered in the waveguide combiner 100 by the edge 105. The refractive index of about 1.7 or greater of the optically absorbent composition 107 is matched to high refractive index substrates, i.e., the substrate 101 having a refractive index greater than about 1.8, to provide for further absorption of stray light. The optically absorbent composition 107 formed by the method 200 described herein utilizes an formulation that provides for a viscosity, surface tension, chemical and physical stability, and environmental reliability such that the formulation is operable to be applied to the edge 105 with an edge blacking tool and remain on the edge 105 prior to curing.

Figure 2:
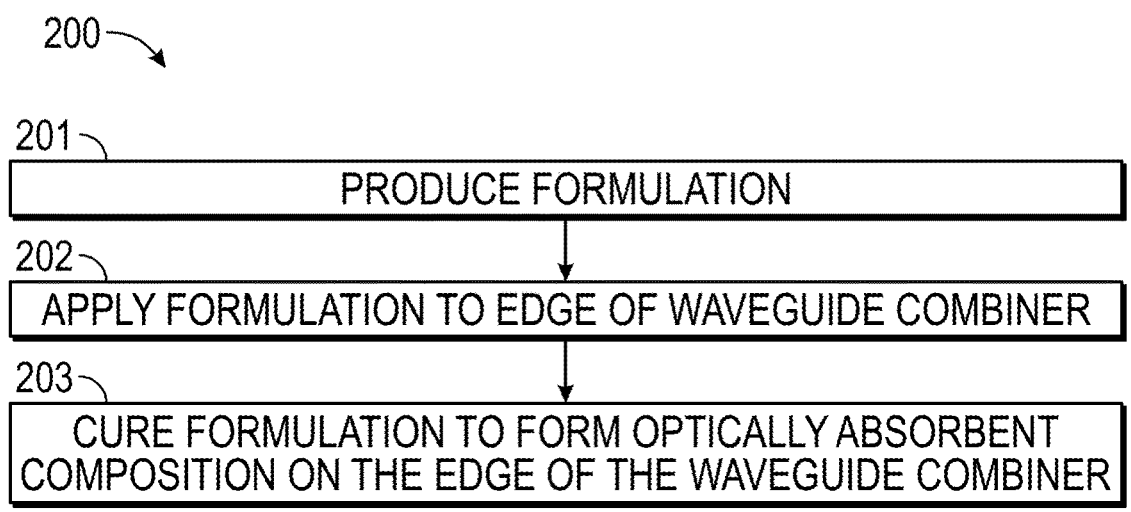
FIG. 2 is a flow diagram of a method of forming an optically absorbent composition on an edge of a waveguide combiner.

FIG. 2 is a flow diagram of a method 200 of forming an optically absorbent composition 107 on an edge 105 of a waveguide combiner 100. To facilitate explanation, the method 200 will be described with reference to the waveguide combiner 100 of FIG. 1. However, it is to be noted that the waveguide combiner 100 is an exemplary waveguide combiner and other waveguide combiners may have an edge coated with the optically absorbent composition 107 in conjunction with method 200.

At operation 201, a formulation is produced. The formulation includes one or more types of particles, at least one of one or more dyes or one or more pigments, one or more binders, and one or more solvents. The formulation may further include one or more filler dispersions, one or more photoiniators, one or more epoxy resins, one or more additives, one or more silanes, one or more isocyanates, one or more acids, one or more phosphine oxides, or combinations thereof. The one or more solvents are operable to evaporate or vaporize upon application on the formulation to the edge 105 of the waveguide combiner 100. The formulation provides for a viscosity, surface tension, chemical and physical stability, and environmental reliability such that the formulation is operable to be applied to the edge 105 with an edge blacking tool and remain on the edge 105 prior to curing. The formulation has a viscosity of about 1 kcP to 100 kcP. At operation 202, the formulation is applied to the edge 105 of the waveguide combiner 100. The formulation may be applied with an edge blackening tool. In one example, the edge blackening tool includes a substrate support operable to retain an optical device substrate, a first actuator configured to rotate the substrate support; a holder configured to hold a coating applicator against the edge 105 of the substrate 100 when the substrate 100 is rotated on the substrate support, a second actuator operable to apply a force on the holder in a direction towards the substrate support to apply the formulation to the edge 105.

The one or more solvents evaporate or vaporize and the one or more types of particles, at least one of one or more dyes or one or more pigments, one or more binders remain. At operation 203, the formulation is cured to form the optically absorbent composition 107 on the edge 105 of the waveguide combiner 100. The one or more binders are cured by radiation to form a polymer matrix. The one or more types of particles are disposed in and supported by the polymer matrix. The one or more binders include, but are not limited to, a UV curable binder, a LED curable binder, a thermal curable binder, an infrared curable binder, or combinations thereof. Thus, the cure process of operation 203 includes a UV cure process, a LED cure process, a thermal cure process, an infrared cure process, or a combination thereof.

In summation, a waveguide combiner having an edge coated with an optically absorbent composition and a method of coating the edge of the waveguide combiner with the optically absorbent composition are described herein. The optically absorbent composition formed the method described herein utilizes an formulation that provides for a viscosity, surface tension, chemical and physical stability, and environmental reliability such that the formulation is operable to be applied to the edge with an edge blacking tool and remain on the edge prior to curing. The one or more binders are cured by radiation to form a polymer matrix. The one or more types of particles are disposed in and supported by the polymer matrix. The refractive index of about 1.7 or greater and the optical density of about 2.0 or greater of the optically absorbent composition reduce the amount of stray light transmitted through the edge and the amount of stray light scattered in the waveguide combiner by the edge.

While the foregoing is directed to examples of the present disclosure, other and further examples of the disclosure may be devised without departing from the basic scope thereof, and the scope thereof is determined by the claims that follow.

What is claimed is:

1. A waveguide combiner, comprising:
a substrate having an outer edge;
a plurality of structures disposed on the substrate; and
an optically absorbent composition disposed on the outer edge of the substrate, the optically absorbent composition comprising:
one or more types of particles;
at least one of one or more dyes or one or more pigments;
a polymer matrix of one or more binders; and
a refractive index of 1.7 or greater.

2. The waveguide combiner of claim 1, wherein regions of the optical device structures correspond to one or more gratings.

3. The waveguide combiner of claim 2, wherein the one or more gratings include an input coupling grating and an output coupling grating.

4. The waveguide combiner of claim 1, wherein the one or more types of particles comprise at least nanoparticles or microparticles.

5. The waveguide combiner of claim 4, wherein the nanoparticles or microparticles contain one or more types of ligands coupled to an outer surface of the nanoparticles or microparticles.

6. The waveguide combiner of claim 1, wherein a particle refractive index of the one or more types of particles is greater than 2.0.

7. The waveguide combiner of claim 1, wherein the one or more types of particles comprise titanium oxide ($TiO_2$), silicon (Si), zirconium oxide ($ZrO_2$), zinc oxide (ZnO), ferrosoferric oxide ($Fe_3O_4$), germanium (Ge), silicon carbide (SiC), diamond, dopants thereof, or any combination thereof.

8. The waveguide combiner of claim 1, wherein the optically absorbent composition further comprises one or more filler dispersions, one or more photoinitiators, one or more epoxy resins, one or more additives, one or more silanes, one or more isocyanates, one or more acids, one or more phosphine oxides, or combinations thereof.

9. The waveguide combiner of claim 1, wherein the optically absorbent composition has an optical density of about 2.0 or greater.

10. The waveguide combiner of claim 1, wherein the one or more pigments comprise carbon black, carbon nanotubes, iron oxide black, black pigments, or combinations thereof.

11. The waveguide combiner of claim 1, wherein the one or more binders comprise a UV curable binder, a LED curable binder, a thermal curable binder, an infrared curable binder, or combinations thereof.

12. The waveguide combiner of claim 1, wherein the substrate comprises silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), sapphire, lithium tantalate ($LiTaO_3$), lithium niobate ($LiNbO_3$), or combinations thereof.

13. The waveguide combiner of claim 1, wherein the one or more types of particles are disposed in and supported by the polymer matrix.

14. A waveguide combiner, comprising:
a substrate having an outer edge and a substrate refractive index greater than about 1.8, the substrate comprising silicon carbide (SiC), lithium niobate (LiNbO3), lithium tantalate (LiTaO3), or combinations thereof;
a plurality of structures disposed on the substrate; and
an optically absorbent composition disposed on the outer edge of the substrate, the optically absorbent composition having a refractive index of about 1.7 or greater and an optical density of about 2.0 or greater, the optically absorbent composition comprising:
one or more types of nanoparticles or microparticles;
at least one of one or more dyes or one or more pigments; and
a polymer matrix of one or more binders, wherein:
the one or more types of nanoparticles or microparticles are disposed in and supported by the polymer matrix; and
the one or more binders are curable by radiation.

15. The waveguide combiner of claim 14, wherein the one or more binders comprise a UV curable binder, a LED curable binder, a thermal curable binder, an infrared curable binder, or combinations thereof.

16. The waveguide combiner of claim 14, wherein the plurality of structures are nanostructures having sub-micron dimensions.

17. A method, comprising:
producing an optically absorbent formulation, the optically absorbent formulation comprising:
one or more types of particles;
at least one of one or more dyes or one or more pigments;
one or more binders; and
one or more solvents;
applying the optically absorbent formulation on an outer edge of a waveguide combiner using an edge blackening tool; and
curing the formulation with radiation to form an optically absorbent composition comprising:
the one or more types of particles;
the at least one of one or more dyes or one or more pigments;
a polymer matrix of the one or more binders, wherein the particles are disposed in and supported by the polymer matrix; and
a refractive index of 1.7 or greater.

18. The method of claim 17, wherein the one or more binders comprise a UV curable binder, a LED curable binder, a thermal curable binder, an infrared curable binder, or combinations thereof.

19. The method of claim 18, wherein curing the formulation comprises a UV cure process, a LED cure process, a thermal cure process, an infrared cure process, or a combination thereof.

20. The method of claim 17, wherein the optically absorbent composition has an optical density of about 2.0 or greater.

21. The method of claim 17, wherein the substrate comprises silicon carbide (SiC), lithium niobate ($LiNbO_3$), or combinations thereof.

22. The waveguide combiner of claim 4, wherein the one or more types of particles are coated particles having a shell disposed around a core.

* * * * *